United States Patent
Okazaki

(10) Patent No.: US 10,583,607 B2
(45) Date of Patent: Mar. 10, 2020

(54) LAMINATION MOLDING APPARATUS

(71) Applicant: Sodick Co., Ltd., Kanagawa (JP)

(72) Inventor: Shuji Okazaki, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 59 days.

(21) Appl. No.: 15/468,029

(22) Filed: Mar. 23, 2017

(65) Prior Publication Data

US 2017/0274590 A1    Sep. 28, 2017

(30) Foreign Application Priority Data

Mar. 23, 2016  (JP) ................................. 2016-058152

(51) Int. Cl.
  *B29C 64/20*    (2017.01)
  *B29C 64/188*   (2017.01)
  (Continued)

(52) U.S. Cl.
  CPC ............ *B29C 64/20* (2017.08); *B22F 3/1055* (2013.01); *B29C 64/153* (2017.08);
  (Continued)

(58) Field of Classification Search
  CPC .. B22F 3/1055; B22F 2003/1056; B22F 3/24; B22F 2003/247; B22F 2999/00;
  (Continued)

(56) References Cited

U.S. PATENT DOCUMENTS 5,141,212 A * 8/1992 Beeding ................ B25B 11/005
                                                       248/363
9,808,864 B2 * 11/2017 Kawada ................ B22F 3/1007
(Continued)

FOREIGN PATENT DOCUMENTS

EP    0 790 875 B1    11/2000
EP      0790875 B1 *  11/2000   ............ B22F 3/1055
(Continued)

OTHER PUBLICATIONS

Nippon.com, Hybrid Metal Laser Sintering & Milling Machine, YouTube video published on Sep. 24, 2014 https://www.youtube.com/watch?v=CCfeJfkC1_s (Year: 2014).*
(Continued)

*Primary Examiner* — Joseph S Del Sole
*Assistant Examiner* — Jerzi H Moreno Hernandez
(74) *Attorney, Agent, or Firm* — Maier & Maier, PLLC

(57) ABSTRACT

A lamination molding apparatus, including a chamber covering a molding region; a powder layer forming apparatus to form a material powder layer by discharging the material powder onto the molding region and planarizing the material powder on the molding region; a laser beam emitter to emit a laser beam for sintering the material powder to form a sintered body; a cutting machine to cut the sintered body; a horizontal drive device to move both the cutting machine and the powder layer forming apparatus in a horizontal direction parallel to the molding region; a first vertical drive device to reciprocate the cutting machine in a vertical direction orthogonal to the horizontal direction; and a second vertical drive device to reciprocate the powder layer forming apparatus in the vertical direction, is provided.

5 Claims, 15 Drawing Sheets

(51) Int. Cl.
*B29C 64/153* (2017.01)
*B22F 3/105* (2006.01)
*B33Y 30/00* (2015.01)

(52) U.S. Cl.
CPC ............ *B29C 64/188* (2017.08); *B33Y 30/00* (2014.12); *B22F 2003/1056* (2013.01)

(58) Field of Classification Search
CPC ..... B29C 64/153; B29C 64/188; B29C 64/20; B29C 69/001; B33Y 70/00; B33Y 40/00; B33Y 30/00
See application file for complete search history.

(56) References Cited

U.S. PATENT DOCUMENTS

| | | | | |
|---|---|---|---|---|
| 2001/0050448 | A1* | 12/2001 | Kubo | B33Y 30/00 264/308 |
| 2002/0041818 | A1* | 4/2002 | Abe | B22F 3/1055 419/7 |
| 2009/0033003 | A1* | 2/2009 | Sievers | B22F 3/1055 264/497 |
| 2010/0233012 | A1* | 9/2010 | Higashi | B22F 3/1055 419/9 |
| 2012/0322154 | A1* | 12/2012 | Park | B29C 64/112 435/395 |
| 2015/0321246 | A1* | 11/2015 | Bohra | B22C 9/02 164/17 |
| 2015/0367573 | A1 | 12/2015 | Okazaki et al. | |
| 2017/0136540 | A1* | 5/2017 | Dods | B29C 64/20 |
| 2017/0136545 | A1* | 5/2017 | Yoshimura | B29C 64/20 |
| 2018/0253080 | A1* | 9/2018 | Meess | G05B 19/4099 |

FOREIGN PATENT DOCUMENTS

| | | | |
|---|---|---|---|
| JP | H10-76156 | A | 3/1998 |
| JP | 2012-246541 | A | 12/2012 |
| JP | 2012246541 | A * | 12/2012 |
| JP | 2015-030883 | A | 2/2015 |
| JP | 5721886 | B1 | 5/2015 |
| JP | 2015-157405 | A | 9/2015 |

OTHER PUBLICATIONS

Japanese Office Action dated Sep. 26, 2017, in connection with the counterpart JP Application No. 2016-058152 (5 pgs., including English translation).

German Office Action dated Jan. 29, 2019, in connection with counterpart DE Application No. 10 2017 106 261.0 (12 pgs., including machine-generated English translation).

* cited by examiner

LAMINATION MOLDING APPARATUS

BACKGROUND OF THE INVENTION

Field of the Invention

The present invention relates to a lamination molding apparatus.

Background of the Invention

In a lamination molding method using laser beam, a very thin material powder layer is formed on a molding table capable of moving vertically, followed by irradiation of a predetermined position of the material powder layer with a laser beam, thereby sintering the material powder. These procedures are repeated to attain the desired three-dimensional shape of a sintered object integrally formed by laminating a plurality of sintered layers. If necessary, while molding of the object, cutting may be applied to the surface or unnecessary portion of the sintered object obtained by sintering the material powder, using a rotary cutting tool capable of moving horizontally and vertically such as an end mill or the like. Over the combination and repetition of these steps, a desired molded object is formed.

In the laser molding method using the laser beam, in order to prevent alteration of the material powder and allow stable irradiation of the laser beam with required energy at all times, a sealed chamber is filled with inert gas, so that the laser beam can be emitted to a predetermined irradiation region in an atmosphere with a sufficiently low oxygen concentration in the chamber. Also, when sintering by irradiating the material powder with the laser beam, specific smoke called fume is generated. When the chamber is filled with the fume, the laser beam is blocked by the fume and the laser beam with the required energy to sinter does not reach the irradiation position substantially, and thereby an inferior sintering may occur. Then, the lamination molding apparatus configured to supply clean inert gas into the chamber and to discharge the inert gas containing fumes from the chamber, is known.

Here, the lamination molding apparatus using the method of selective laser sintering disclosed in Patent Document 1 comprises a recoater head that moves in a horizontal one axis direction. The recoater head forms a material powder layer in a desired region on a molding table by free-falling the material powder contained therein from the powder supply port and planarizing the material powder.

PRIOR ART DOCUMENTS

Patent Literature

[Patent Document 1] JP 5721886

SUMMARY OF INVENTION

Technical Problem

However, the recoater head moving in a horizontal one axis direction according to Patent Document 1 is incapable of locally forming the material powder layer. Regardless of the size of a molded object, the material powder layer is formed substantially on the whole surface of the molding table as the molding region. In other words, the smaller the size of the molded object is, the more material powder is left in the molding region, such powder not contributing directly to the molding of the molded object. Although it is possible to collect the remaining material, at the time of collection, the powder which can be recycled is mixed with the material powder which cannot be recycled including chips generated by the cutting, and spatters that splash during laser sintering. For that reason, it is necessary to separate the material powder which can be recycled and the material powder which cannot be recycled, which causes the working efficiency to be reduced. Furthermore, when the molding lasts for a long period of time, the material shortage tends to occur during the molding. It may be necessary to take out the material powder supplied extra during the molding, to perform the above-mentioned separation work, and to re-supply the powder material. Therefore, it is required to prepare an extra amount of the material powder in a sufficiently larger amount than the material powder used for the molded object itself. However, since the material powder is generally expensive, the molding with as few materials as possible, is required.

Also, a drive device including driving source and guiding mechanism is essentially required to move the recoater head, but in order to protect it from the material powder, preferably the drive device may be provided outside the chamber. On the other hand, the sealability of the chamber decreases, the structure around the molding region becomes complicated and the accessibility also deteriorates. Furthermore, the lamination molding apparatus with the cutting machine for the cutting requests to prevent the physical interference between the recoater head and the cutting machine. As a result, the chamber tends to become larger.

The present invention has been made by taking these circumstances into consideration. An objective of the present invention is to provide a lamination molding apparatus, capable of reducing the usage of material powder, having a small chamber of which the sealability is high.

Means to Solve the Problem

According to an aspect of the present invention, a lamination molding apparatus, comprising: a chamber covering a molding region; a powder layer forming apparatus to form a material powder layer by discharging the material powder onto the molding region and planarizing the material powder on the molding region; a laser beam emitter to emit a laser beam for sintering the material powder to form a sintered body; a cutting machine to cut the sintered body; a horizontal drive device to move both the cutting machine and the powder layer forming apparatus in a horizontal direction parallel to the molding region; a first vertical drive device to reciprocate the cutting machine in a vertical direction orthogonal to the horizontal direction; and a second vertical drive device to reciprocate the powder layer forming apparatus in the vertical direction, is provided.

Effect of the Invention

In the lamination specification apparatus according to the present invention, a powder layer forming apparatus forming the material powder layer in the molding region, and a cutting machine are provided in the same horizontal drive device, which can be controlled to move together in the horizontal direction. On the other hand, vertical devices are provided separately and are configured to be independently controllable to move in the vertical direction. With such a configuration, it is possible to realize the reduction of the usage of the material powder and the small chamber with the high sealability.

Hereinafter, various embodiments of the present invention will be provided. The embodiments provided below can be combined with each other.

Preferably, when cutting the sintered body, the cutting machine is moved vertically downward and the powder layer forming apparatus is moved vertically upward to a position not interfering with the cutting.

Preferably, the powder layer forming apparatus is configured to be capable of switching start and stop of discharge of the material powder.

Preferably, the powder layer forming apparatus includes a material discharge unit for discharging the material powder into the molding region, a shutter for opening and closing the material discharge unit, and a shutter through-hole accommodating the shutter therein slidably.

Preferably, the apparatus is configured to execute a molding cycle in which the material powder layer is formed and sintered with the laser beam, the molding cycle being executed for a plurality of local regions which are different each other in the molding region, adjacent two of the local regions in a same layer being partially overlapped each other.

DESCRIPTION OF THE PREFERRED EMBODIMENTS

Hereinafter, some embodiments of the present invention will be described with reference to the drawings. Here, the characteristic matters shown in the embodiments can be combined with each other.

Figure 1:
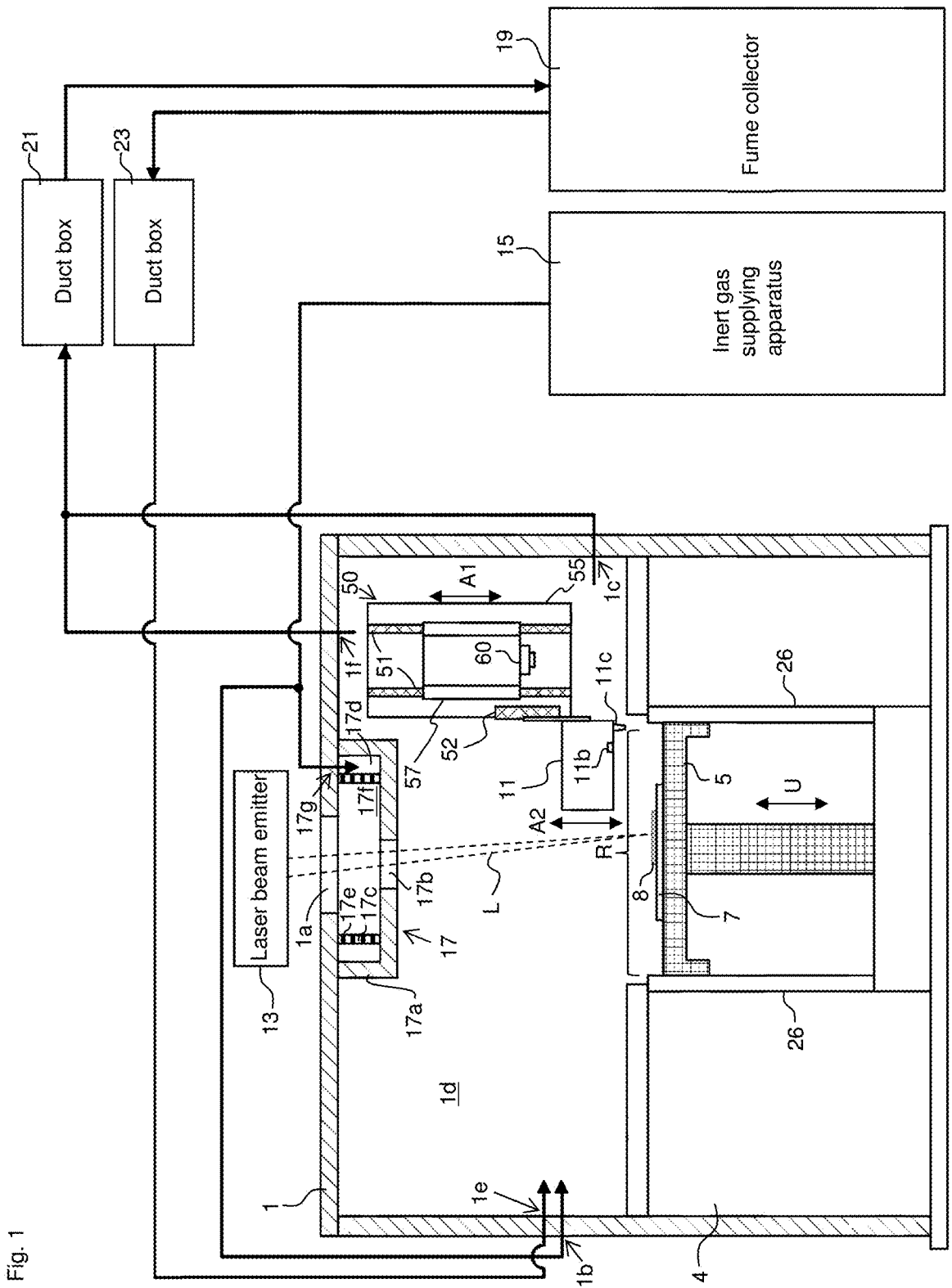
FIG. 1 is a configuration diagram of a lamination molding apparatus according to an embodiment of the present invention.

As shown in FIG. 1, a lamination molding apparatus according to an embodiment of the present invention is provided with a powder layer forming apparatus 11 and cutting machine 50 in a chamber 1 filled with inert gas. In the present specification, the "inert gas" is a gas which does not substantially react with material powder, and examples thereof include nitrogen gas, argon gas and helium gas.

Also, the lamination molding apparatus has a base 4 having a molding region R in the chamber 1, and in the molding region R, a molding table 5 which can vertically move (in a direction indicated as arrow U in FIG. 1) is provided. In other words, the horizontal projection area of the molding table 5 substantially matches the molding region R. When using the lamination molding apparatus, a molding plate 7 is placed on the molding table 5, and a material powder layer 8 is formed thereon. Hereinafter, the "molding region R" means a region in which the material powder layer 8 can be formed. In addition, the irradiation region is a region in which the material powder layer 8 is irradiated with the laser beam L.

A powder retaining wall 26 is provided around the molding table 5, and the non-sintered material powder is retained in the powder retaining space surrounded by the powder retaining wall 26 and the molding table 5. Although not shown in FIG. 1, below the powder retaining wall 26, a powder discharging section capable of discharging the material powder in the powder retaining space may be provided. In this case, after completion of the lamination molding, the molding table 5 is descended so as to discharge the non-sintered material powder from the powder discharging section. The material powder discharged is guided to the chute by the chute guide, and then the material powder is retained in the bucket via the chute.

As shown in FIG. 1, the powder layer forming apparatus 11 and cutting machine 50 are provided in a same horizontal drive device 55. In other words, the horizontal drive device 55 comprises a cutting machine 50 provided on a first vertical drive device 51, and a powder layer forming apparatus 11 provided on a second vertical drive device 52. The horizontal drive device 55 moves the cutting machine 50 and powder layer forming apparatus 11 together in the directions of the horizontal two axes substantially parallel to the molding region R.

The cutting machine 50 has a machining head 57 and a spindle head 60. The machining head 57 is provided with a spindle head 60, and the machining head 57 moves the spindle head 60 in the vertical one axis direction (i.e., a direction indicated as arrow A1 in FIG. 1) via the first vertical drive device 51. That is, the height position of a rotary cutting tool mounted on the spindle head 60 can be adjusted. The first vertical drive device 51 is, for example, a linear motor.

The spindle head 60 is configured so that a rotary cutting tool such as an end mill (not shown) is attached and is allowed to rotate, thereby the cutting to the surface of a sintered layer obtained by sintering the material powder or unnecessary portions can be implemented. The rotary cutting tool is preferably a plurality of types of rotary cutting tools, and the rotary cutting tool to be used can be exchanged during the molding by an automatic tool changer (not shown).

Figure 3:
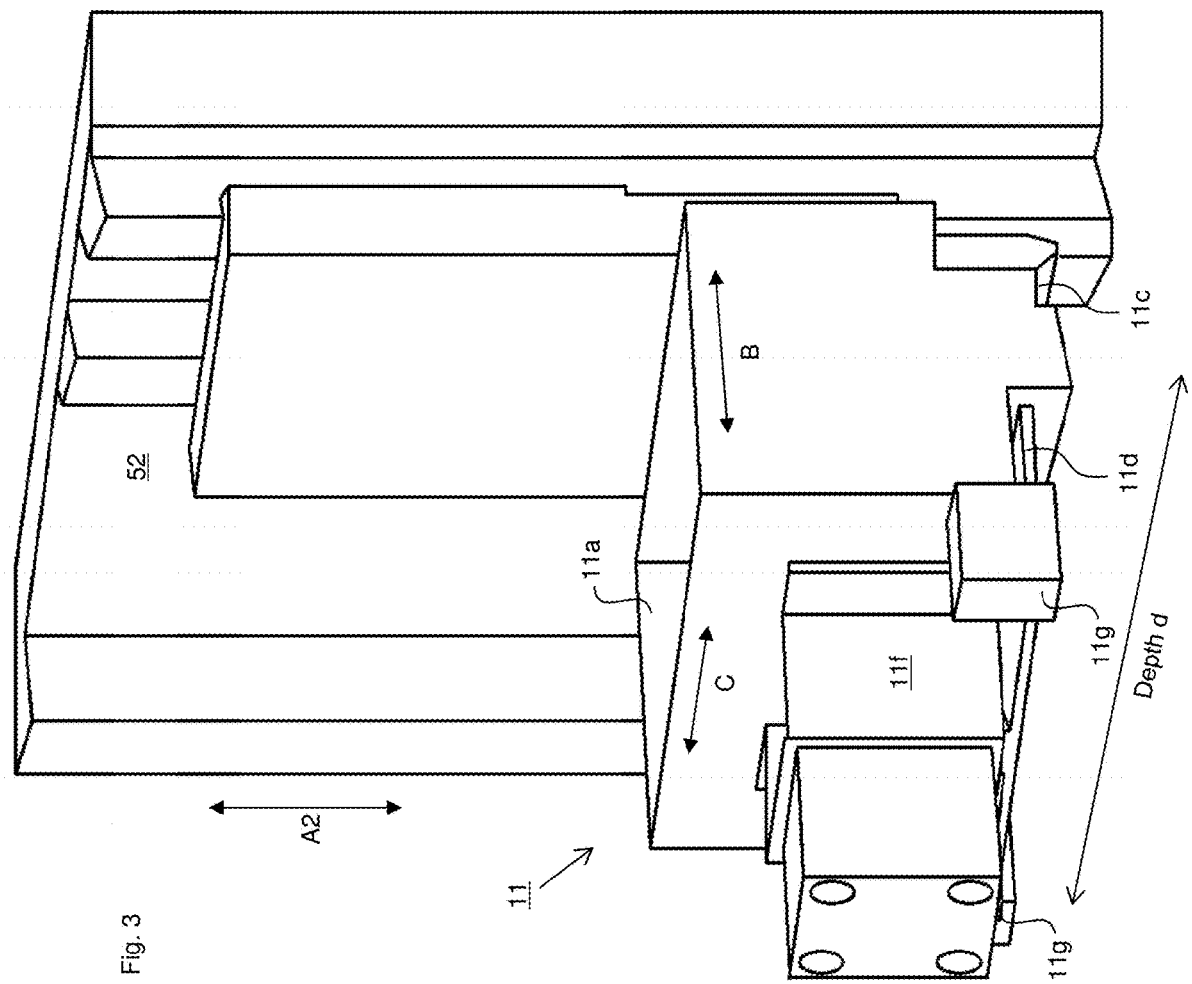
FIG. 3 is a perspective view of a powder layer forming apparatus 11 according to an embodiment of the present invention.
Figure 4:
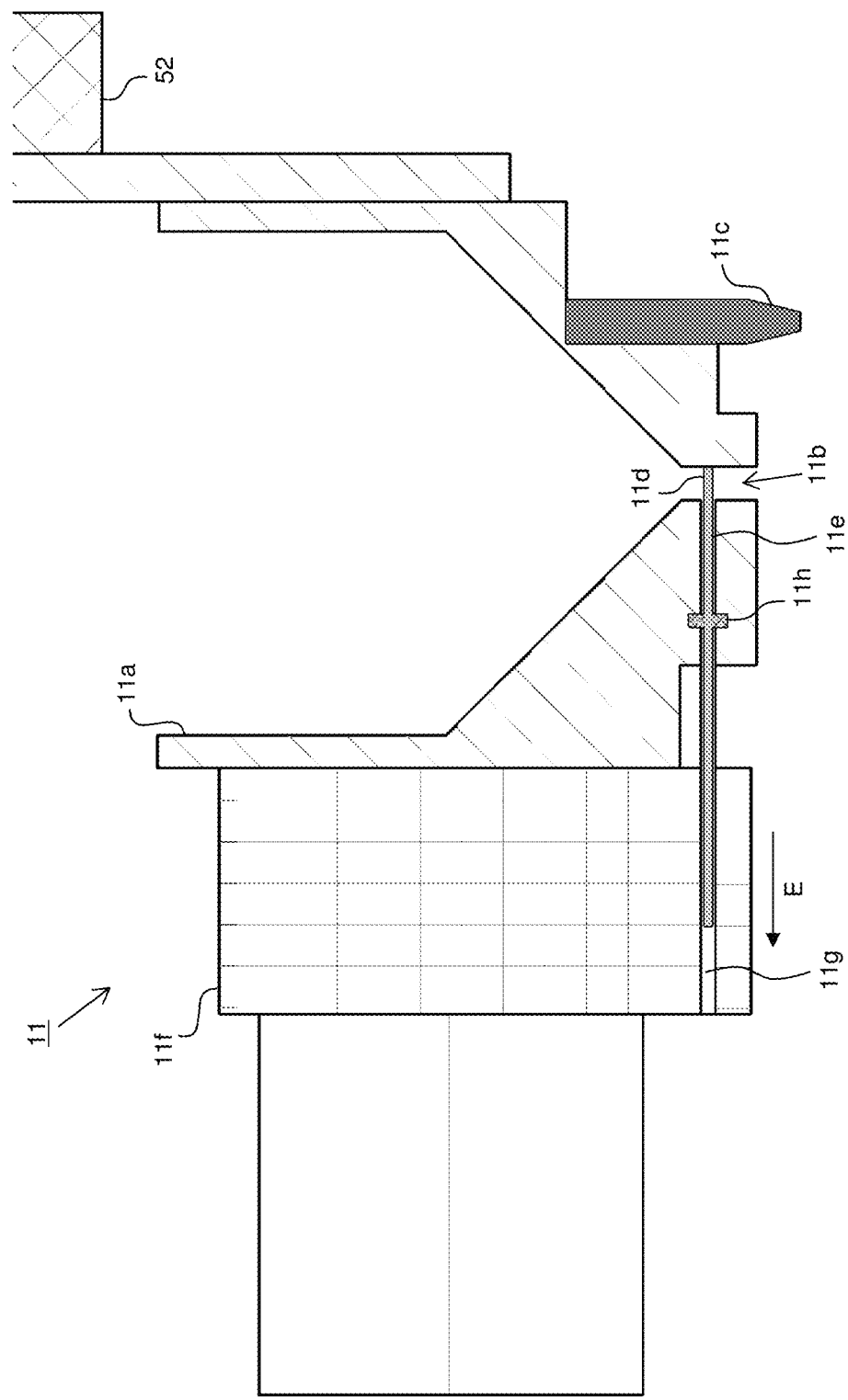
FIGS. 4 and 5 are cross-sectional views of a powder layer forming apparatus 11 according to an embodiment of the present invention.
Figure 5:
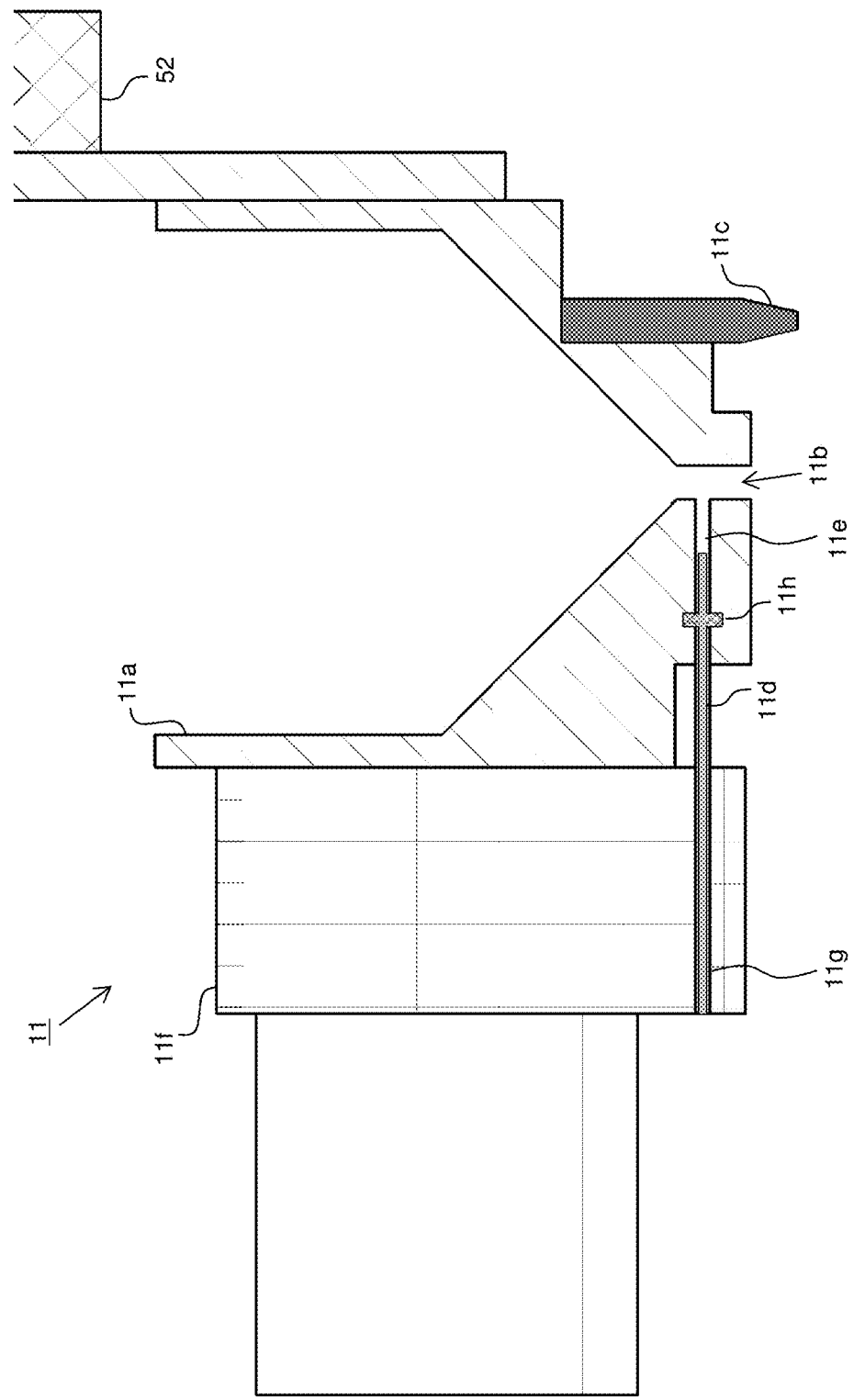

As shown in FIGS. 3-5, the powder layer forming apparatus 11 includes a material holding section 11a, material discharge unit 11b, blade 11c, shutter 11d, shutter through-hole 11e, shutter opening/closing unit 11f, shutter groove guide 11g, and seal member 11h. The powder layer forming apparatus 11 is configured to be controllable to move in the vertical one axis direction (i.e., a direction indicated as arrow A2 in FIG. 1) by the second vertical drive device 52 different from the first vertical drive device 51. Therefore, the height of the material discharge unit 11b and blade 11c can be adjusted independently of the height of the cutting machine 50. Note that the second vertical drive device 52 may be, for example, a cylinder.

The material holding section 11a stores the material powder. Note that the material powder is, for example, a metal powder such as an iron powder and for example, a spherical shape having an average particle diameter of 20 µm. As for the supply of the material powder of the material holding section 11a, for example, it is preferable to carry the material powder by air from a separate unit provided outside the chamber 1 via a duct. Alternatively, the powder layer forming apparatus 11 may be moved to a separate device provided inside the chamber 1 and then the material powder may be supplied. Such a configuration is merely an example, and are not limited thereto.

The material discharge unit 11b is a through hole provided at the bottom of the material holding section 11a. The material powder is discharged to a desired region in the molding region R via the material discharge unit 11b. As will be described later, in forming the material powder layer 8 of a predetermined layer by the lamination molding according to the present invention, the material powder layer 8 may be formed in a plurality of times according to the size of the molded object. Hereinafter, each region in which the material powder layer 8 is formed by one forming operation of the material powder layer 8 is called a local region. The blade 11c is provided under the powder layer forming apparatus 11. The blade 11c planarizes the material powder discharged from the material discharge unit 11b. By a process consisting of such discharge and planarization, the material powder layer 8 is formed. Hereinafter, the operation to form the material powder layer 8 including discharge and planarization is called recoating.

The shutter 11d is fitted in the shutter groove guide 11g of the shutter opening/closing unit 11f so as to be slidable. The shutter 11d is inserted into the shutter through-hole 11e provided under the material holding section 11a, and is configured so that the material discharge unit 11b can be opened and closed by the shutter opening/closing unit 11f. The shutter opening/closing unit 11f is, for example by a cylinder, a mechanism for opening and closing the shutter 11d along the shutter groove guide 11g. The opening and closing of the shutter 11d switches start and stop of discharge of the material powder from the material discharge unit 11b. FIG. 4 shows a state in which the shutter 11d is closed. FIG. 5 shows a state in which the shutter 11d is opened by sliding the shutter 11d in the direction indicated as arrow E. Note that it is not limited to such a unidirectional slide type shutter 11d unless no physical interference with the cutting machine 50 is exist. For example, the shutter 11d may be a throttle type, lid type, divided shutters sliding in opposite directions each other, and the like.

Figure 6:
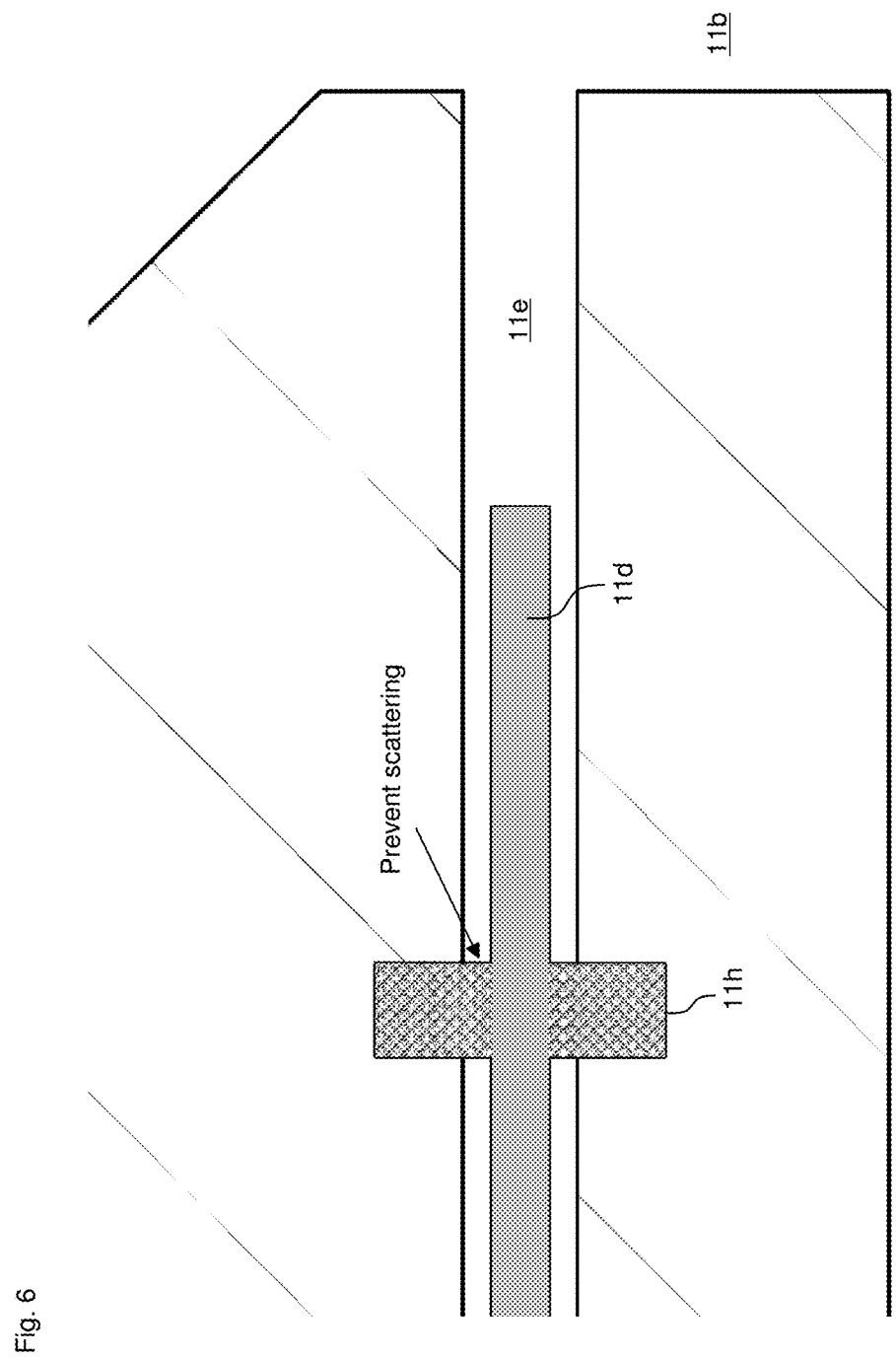
FIG. 6 is an enlarged view of FIG. 5.

Further, as shown in FIG. 6, the seal member 11h having, for example, a substantially rectangular cross section is provided in a gap portion between the side surface of the shutter through-hole 11e and the shutter 11d, thereby the gap portion is sealed. When the shutter 11d is opened, the material powder may be partially drugged by the shutter 11d and scattered into the shutter through-hole 11e. However, by providing the seal member 11h as described above, such scattering can be prevented. Note that in light of the slidability of the shutter 11d, it is preferable to select the seal member 11h with a small friction coefficient and high wear resistance.

Although both the cutting machine 50 and powder layer forming apparatus 11 are provided in the horizontal drive device 55, there is little likelihood that they will be used at the same time. The cutting is performed by the cutting machine 50 after a predetermined number of sintered layers are formed. Therefore, from the viewpoint of preventing physical interference, when using the cutting machine 50, it is preferable to move the cutting machine 50 vertically downward and retract the powder layer forming apparatus 11 in the vertical upward direction. Similarly, when using the powder layer forming apparatus 11, it is preferable to move the powder layer forming apparatus 11 vertically downward and retract the cutting machine 50 in the vertical upward direction. Also, when exchanging the tool automatically, it is preferable to retract the powder layer forming apparatus 11 in the vertical upward direction.

Adopting the above configuration allows the chamber 1 to be smaller than the conventional one. Further, since the conventional recoater head includes, outside the chamber 1, a drive mechanism (ball screw or the like) for driving the recoater head, it is difficult to increase the sealability of the chamber 1. On the other hand, in the present embodiment, the cutting machine 50 and powder layer forming apparatus 11 share the horizontal drive device 55 as the drive device in the horizontal direction. Therefore, there is no need to provide the other drive device only for driving the powder layer forming apparatus 11 in the horizontal direction. Adopting the above configuration allows the sealability of the chamber 1 to be easily enhanced. In addition, since the structure around the molding region R is simplified, the accessibility is improved and maintenance and the like are facilitated.

Figure 2:
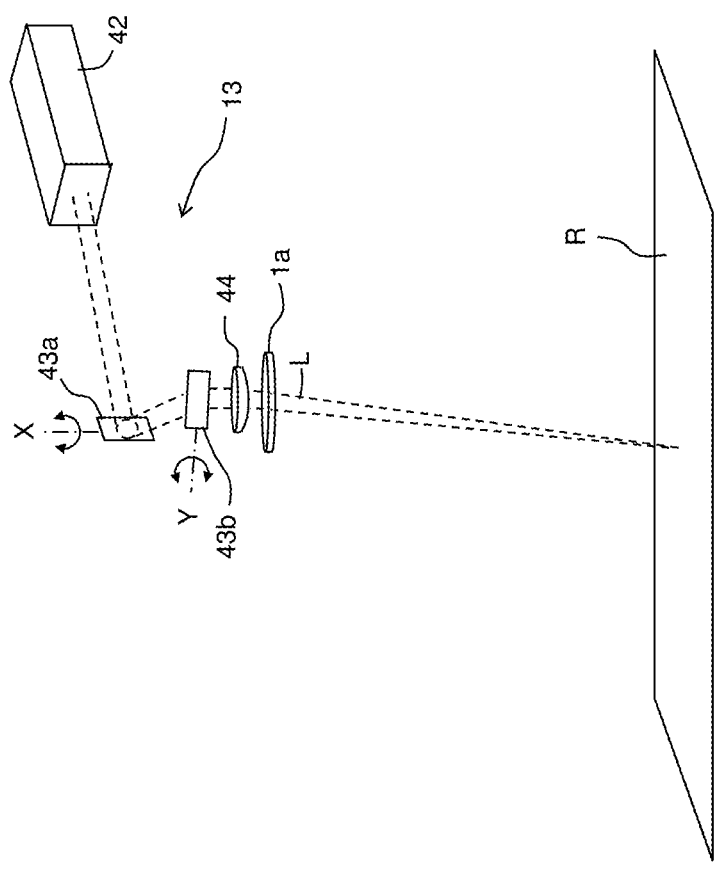
FIG. 2 is a configuration diagram of a laser beam emitter 13 according to an embodiment of the present invention.

A laser beam emitter 13 is provided above the chamber 1. The laser beam emitter 13 irradiates, with laser beam L, a predetermined position of the material powder layer 8 formed on the molding region R so as to sinter the material powder at the irradiation position. Specifically, as shown in FIG. 2, the laser beam emitter 13 comprises a laser beam source 42, two-axis galvanometer mirrors 43a and 43b, and a condensing lens 44. The galvanometer mirrors 43a and 43b includes actuators rotating the galvanometer mirrors 43a and 43b, respectively.

The laser beam source 42 emits the laser beam L. Here, the laser beam L is a laser capable of sintering the material powder, for example, a $CO_2$ laser, fiber laser, YAG laser and the like.

The two-axis galvanometer mirrors 43a and 43b perform two-dimensional scanning of the laser beam L emitted from the laser beam source 42 controllably. The galvanometer mirror 43a scans the laser beam L in the lateral direction in FIG. 2, and the galvanometer mirror 43b scans the laser beam L in the longitudinal direction in FIG. 2. Each of the galvanometer mirrors 43a and 43b is controlled of its rotation angle depending on the size of the rotation angle controlling signal input from a control device (not shown). Accordingly, the laser beam L can be emitted to a desired position by altering the size of the rotation angle controlling signal being input to each of the actuators of the galvanometer mirrors 43a and 43b.

The condensing lens 44 is, for example fθ lens, to condense the laser beam L emitted from the laser beam source 42. Note that, the condensing lens 44 may be arranged between the laser beam source 42, and the galvanometer mirrors 43a and 43b along the laser beam L.

The laser beam L which passed through the galvanometer mirrors 43a and 43b and the condensing lens 44 further passes through the window 1a provided to the chamber 1. Then, the material powder layer 8 formed in the local region of the molding region R is irradiated with the laser beam L. The window 1a is formed with a material capable of transmitting the laser beam L. For example, in a case where the laser beam L is fiber laser or YAG laser, the window 1a can be structured with a quartz glass.

Next, an inert gas supplying/discharging system will be explained. The inert gas supplying/discharging system comprises a plurality of supplying openings and discharging openings of the inert gas provided in the chamber 1, and pipes for connecting each supplying opening and discharging opening to an inert gas supplying apparatus 15 and fume collector 19. In the present embodiment, the supplying openings including the chamber supplying opening 1b, sub supplying opening 1e and fume diffusing device supplying opening 17g, and the discharging openings including a chamber discharging opening 1c and sub discharging opening 1f are provided.

The chamber discharging opening 1c is provided on a side wall of the chamber 1. Also, a suction device (not shown) may be provided so as to connect to the chamber discharging opening 1c. The suction device facilitates eliminating the fume efficiently from the optical path of the laser beam L. In addition, the suction device enables a greater amount of fumes to be discharged through the chamber discharging opening 1c, thereby the fume diffusion within the molding room 1d is alleviated.

The chamber supplying opening 1b is provided on the edge of the base 4 so as to face the chamber discharging opening 1c across a predetermined irradiation region. By such configuration, a flow of the inert gas in the same direction is generated and, consequently, stable sintering is beneficially provided.

The inert gas supplying/discharging system according to the present embodiment comprises a sub supplying opening 1e and sub discharging opening 1f. The sub supplying opening 1e is provided on the side wall of the chamber 1 so as to face the first discharging opening supply 34a, and supplies clean inert gas, of which the fume is removed, sent from the fume collector 19 into the molding room 1d. The sub discharging opening 1f is provided above the chamber discharging opening 1c, and discharges the inert gas containing a large amount of fume which remains on the upper side of the chamber 1.

On the upper surface of the chamber 1, the fume diffusing device 17 is provided so as to cover the window 1a. The fume diffusing device 17 is provided with a cylindrical housing 17a and a cylindrical diffusing member 17c arranged in the housing 17a. An inert gas supplying space 17d is provided in between the housing 17a and the diffusing member 17c. Further, on the bottom surface of the housing 17a, an opening 17b is provided at the inner portion of the diffusing member 17c. The diffusing member 17c is provided with a plurality of pores 17e, and the clean inert gas supplied into the inert gas supplying space 17d via the fume diffusing device supplying opening 33d is filled into a clean room 17f through the pores 17e. Then, the clean inert gas filled in the clean room 17f is discharged towards below the fume diffusing device 17 through the opening 17b. The clean inert gas discharged flows out along the optical path of the laser beam L, and eliminates the fume from the optical path of the laser beam L, thereby preventing the window 1a from being contaminated with the fume.

The inert gas supplying system to supply the inert gas into the chamber 1 is connected with the inert gas supplying apparatus 15 and fume collector 19. The inert gas supplying apparatus 15 has a function to supply the inert gas, and is, for example, a device comprising a membrane type nitrogen separator to extract the nitrogen gas from the circumambient air. In the present embodiment, as shown in FIG. 1, The inert gas supplying apparatus is connected to the chamber supplying opening 1b and fume diffusing device supplying opening 17g.

The fume collector 19 comprises duct boxes 21 and 23 provided at its upper stream side and its lower stream side, respectively. The inert gas containing fume discharged from the chamber 1 through the chamber discharging opening 1c and sub discharging opening 1f is sent to the fume collector 19 through the duct box 21. Then, fume is removed in the fume collector 19, and the cleaned inert gas is sent to the sub supplying opening 1e of the chamber 1 through the duct box 23. According to such constitution, the inert gas can be recycled.

For the inert gas discharging system as shown in FIG. 1, the chamber discharging opening 1c and sub discharging opening 1f are respectively connected with the fume collector 19 through the duct box 21. The inert gas after removal of the fume by the fume collector 19 returns to the chamber 1 and is recycled.

In the chamber 1 being small and having high sealability according to the present invention, the time until the inert gas is filled is shortened and maintenance of the low oxygen atmosphere is easy. Also, since the air volume of the inert gas circulating in the chamber 1 also increases, the efficiency of the removal of the fume increases, and the molding speed and the quality of the molded object are improved.

Next, referring to FIGS. 1 and 7-14, the lamination molding method using the afore-mentioned lamination molding apparatus will be explained. Note that in FIGS. 7-14, in consideration of visibility, some of elements shown in FIG. 1 are omitted.

Figure 7:
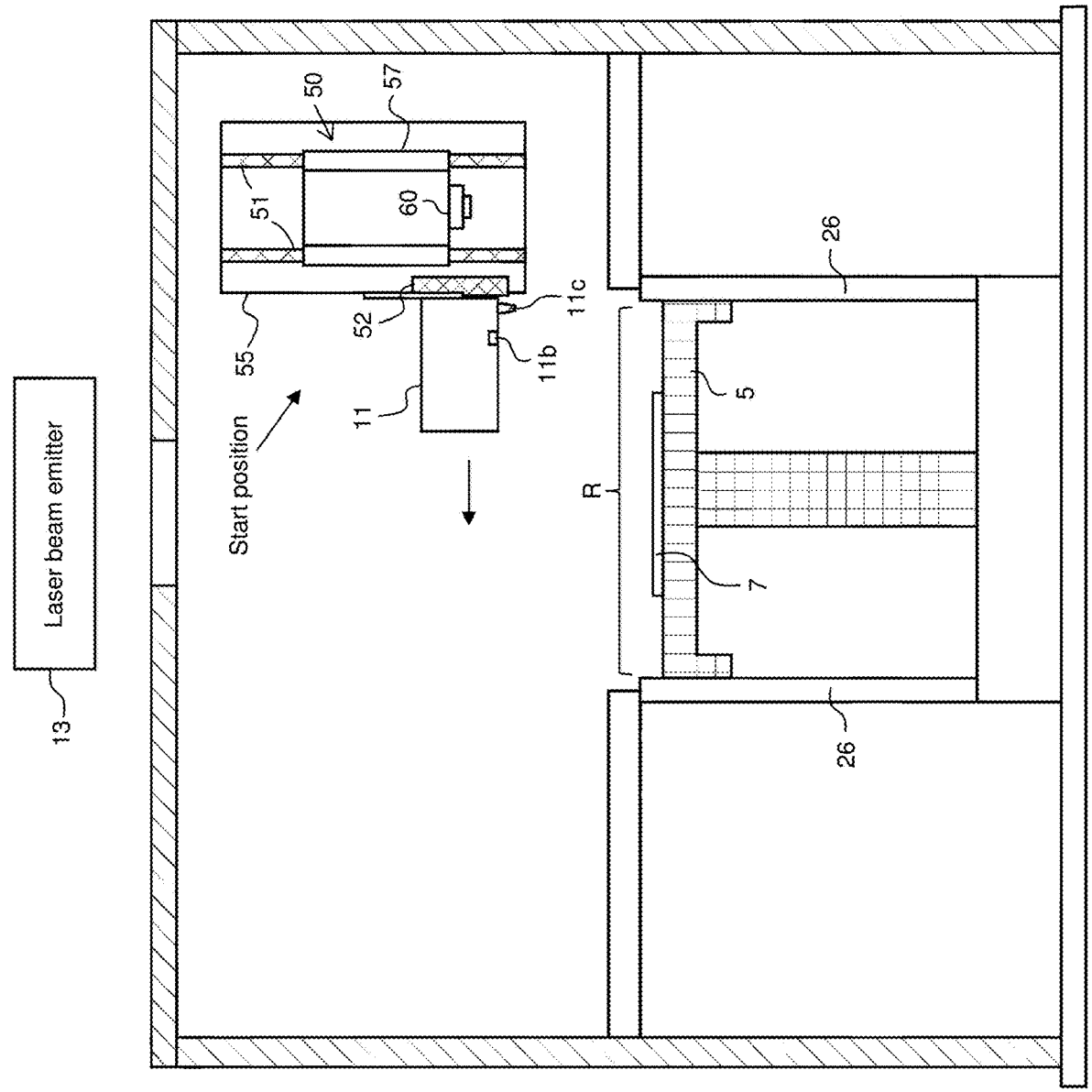
FIGS. 7-11 are explanatory diagrams of a lamination molding method using the lamination molding apparatus according to the embodiment of the present invention.
Figure 8:
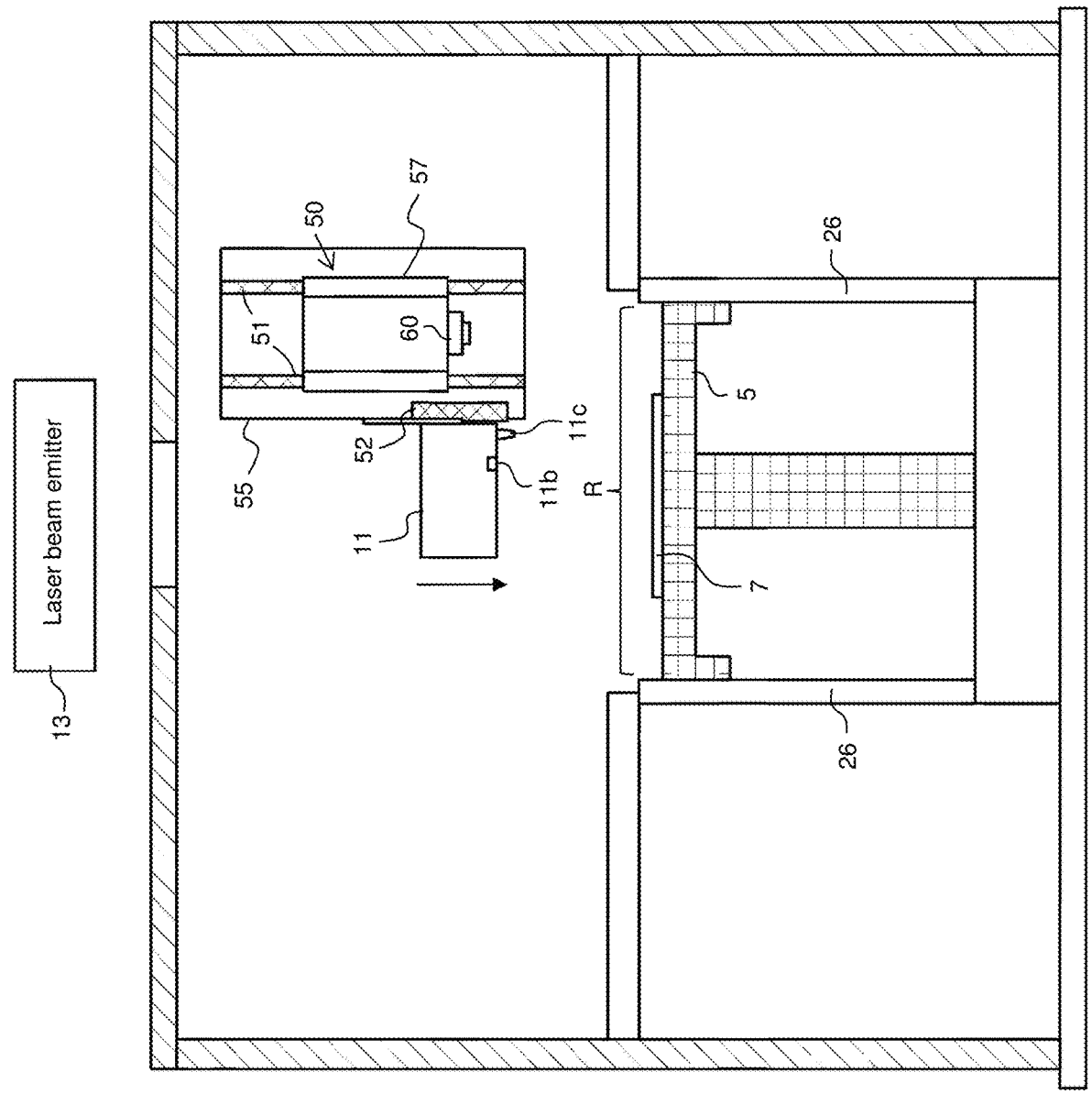

First, the molding plate 7 is placed on the molding table 5, and the height of the molding table 5 is adjusted to an appropriate position as shown in FIG. 7. Next, the horizontal drive device 55 is moved in the direction indicated as arrow, from the start position as shown in FIG. 7. At this time, the positions of the powder layer forming apparatus 11 and cutting machine 50 provided in the horizontal drive device 55 are controlled simultaneously as shown in FIG. 8.

Subsequently, using the second vertical drive device 52, the powder layer forming apparatus 11 is moved in the direction indicated as arrow in FIG. 8. At this time, since the second vertical drive device 52 is separate from the first vertical drive device 51, even if the powder layer forming apparatus 11 is moved, the position of the cutting machine 50 does not change. Although not shown here, if necessary, the cutting machine 50 may be retracted vertically upward using the first vertical drive device 51.

If the vertical drive device of the cutting machine 50 and the that of the powder layer forming apparatus 11 are the same, the cutting machine 50 also moves in the same direction as well as the movement of the powder layer forming apparatus 11 in the vertical direction. Then, the rotary cutting tool (not shown) attached to the spindle head 60 may interfere with the molding table 5 or the molding plate 7. That is, by sharing the drive device in the horizontal two axis directions in which there is almost no possibility of interference, the size reduction of the lamination molding apparatus can be realized as a whole. Further, by using respectively the particular drive device in each vertical direction, the physical interference is prevented.

Figure 9:
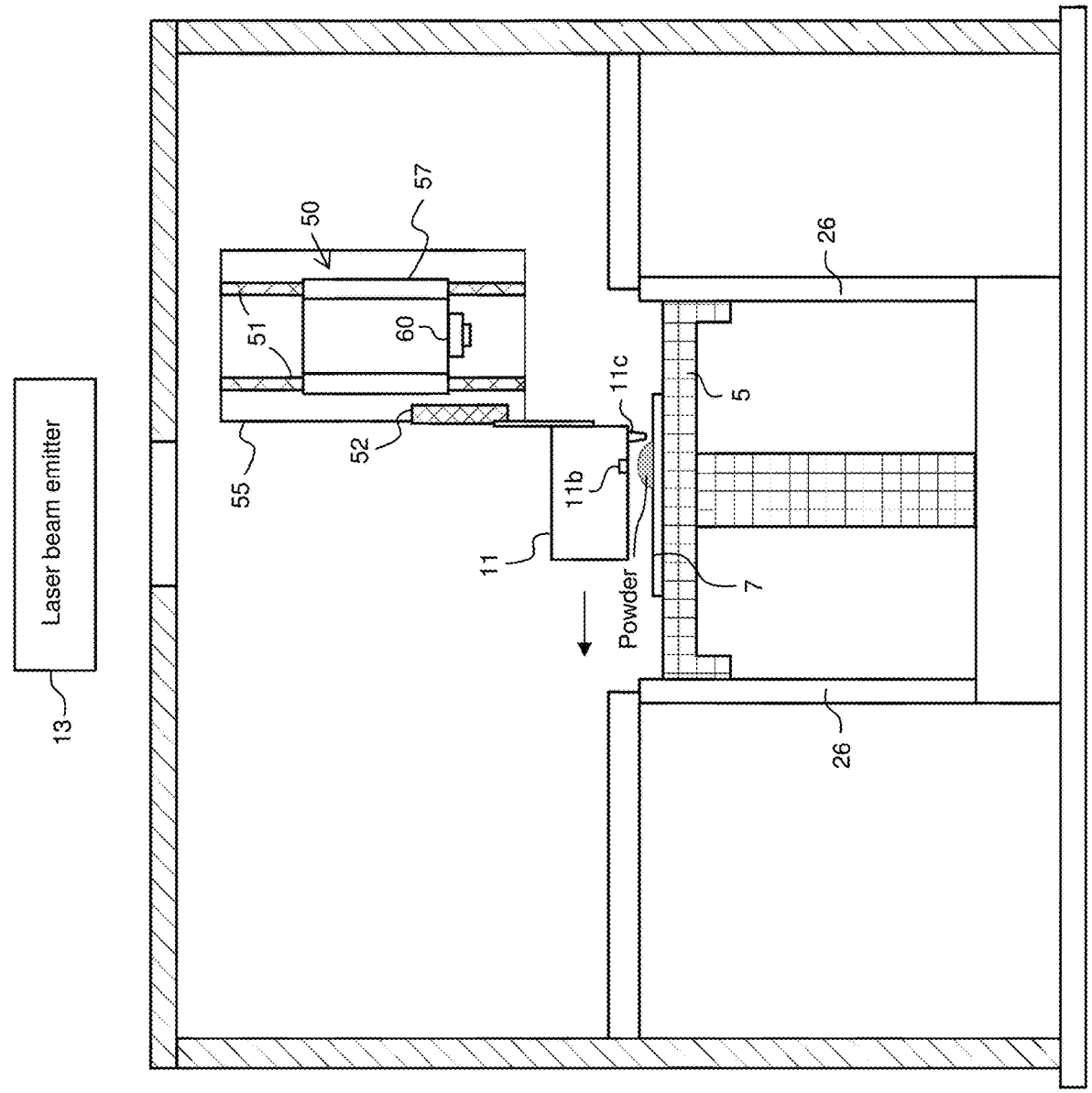
Figure 10:
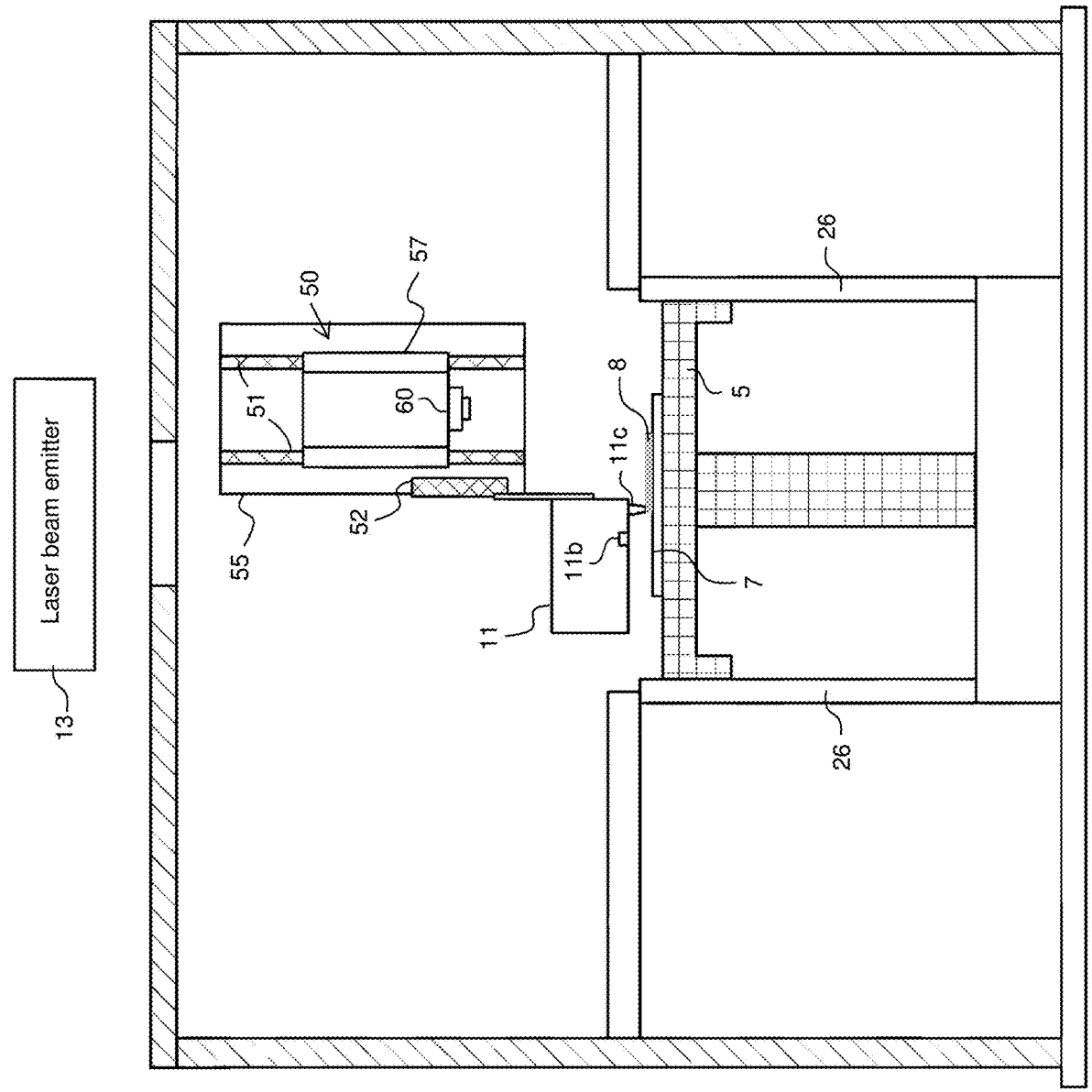

Subsequently, the shutter 11d is opened by the shutter opening/closing unit 11f, so that the material powder is discharged from the material discharge unit 11b onto the molding plate 7 as shown in FIG. 9. Furthermore, by moving the horizontal drive device 55 again in the direction indicated as arrow in FIG. 9, the blade 11c planarizes the material powder discharged in FIG. 9 and the material powder layer 8 is formed in the local region as shown in FIG. 10. After forming the material powder layer 8 in this manner, the shutter 11d is closed by the shutter opening/closing unit 11f, and the discharge of the material powder is stopped. Then, the second vertical drive device 52 moves the powder layer forming apparatus 11 in the vertical upward direction to a position in which the powder layer forming apparatus 11 does not interfere with the cutting.

Figure 11:
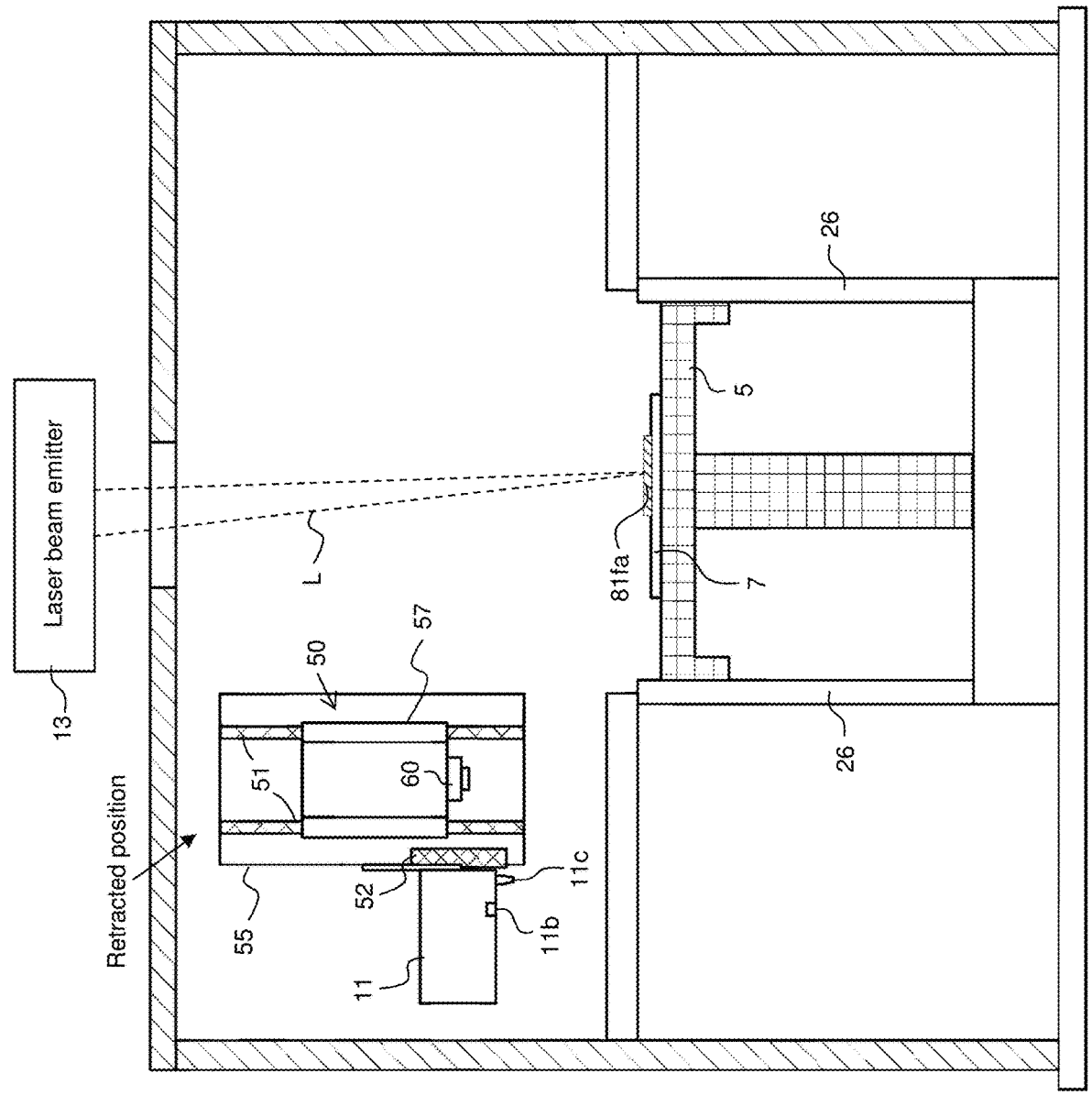

Subsequently, the powder layer forming apparatus 11 and the cutting machine 50 are moved to the retracted position by the horizontal drive device 55. Then, the material powder is irradiated with the laser beam L emitted from the laser beam emitter 13, and a sintered layer 81*fa* is formed as shown in FIG. 11. It is to be understood that the retracted position is not limited to the position shown in FIG. 11. Any position functions enough as the retracted position as long as the laser beam L is not blocked.

That is, a step of forming the material powder layer 8 for one local region and sintering it with the laser beam L, is executed. Hereinafter, this step to mold one sintered layer is referred to as "a molding cycle".

Figure 12:
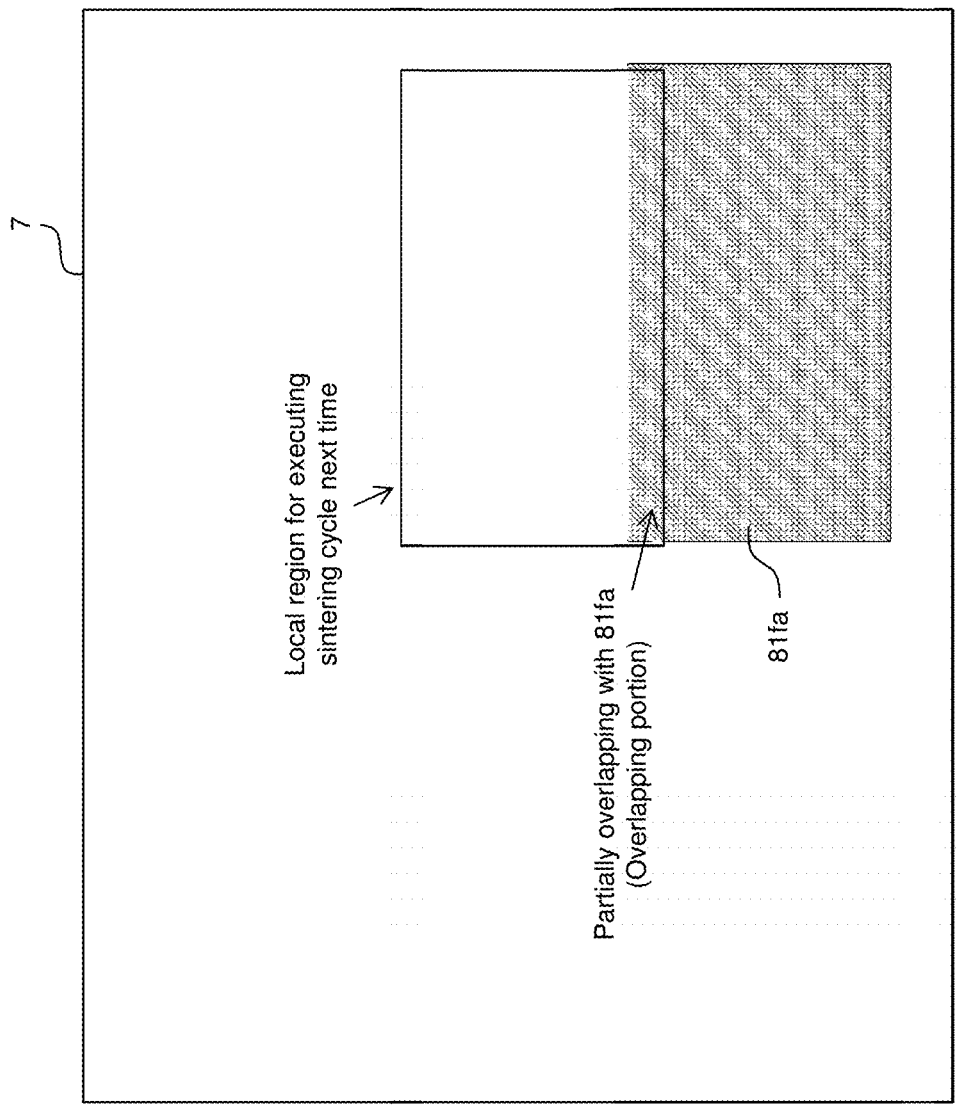
FIGS. 12 and 13 are schematic diagrams showing a preferred local region in the lamination molding method using the lamination molding apparatus according to an embodiment of the present invention.
Figure 13:
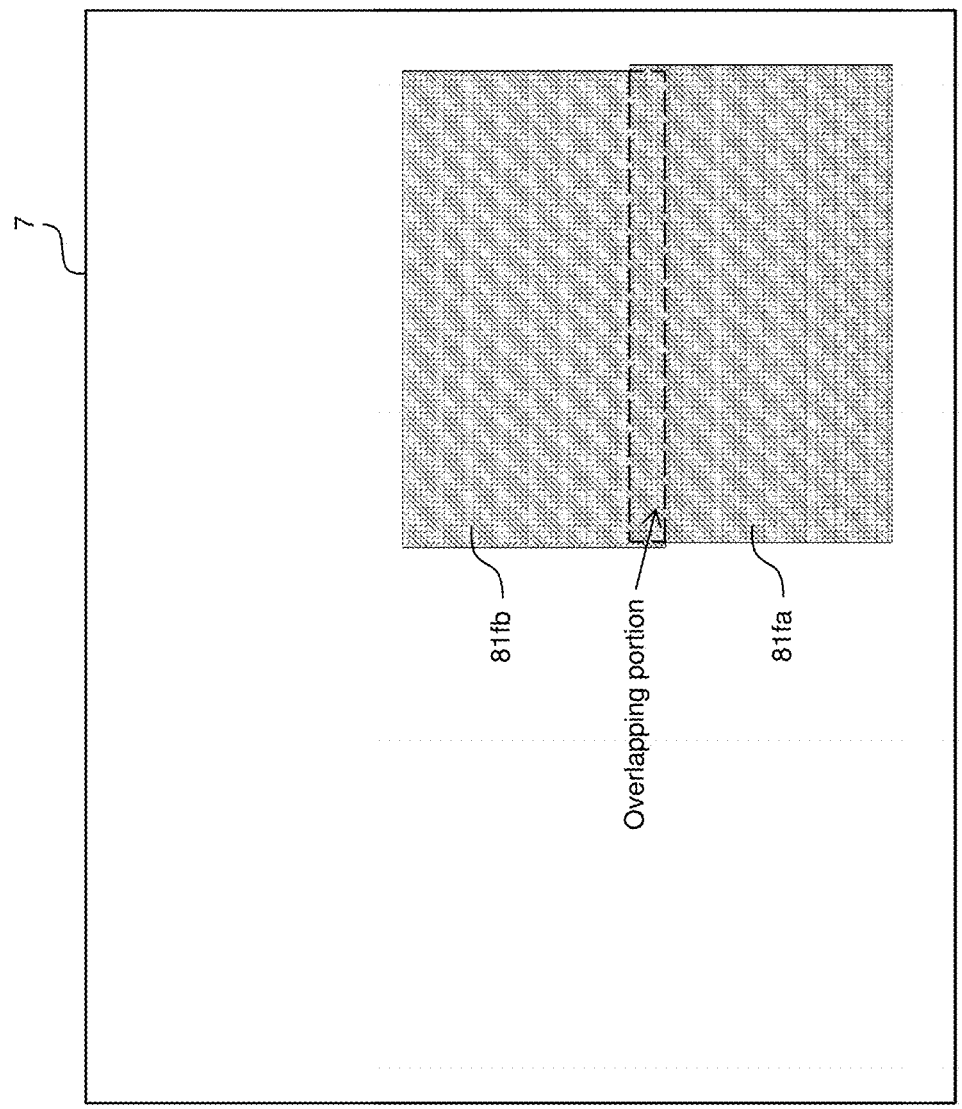

Subsequently, as shown in FIG. 12, the molding cycle is executed in the next local region while maintaining the height of the molding table 5, the next local region being substantially adjacent to the sintered layer 81*fa* in the direction indicated as arrow C (i.e., in FIG. 11, in the direction toward the back of the paper surface with respect to the sintered layer 81*fa*). In such manner, a new sintered layer 81*fb* substantially adjacent to the sintered layer 81*fa* is formed as shown in FIG. 13. Since the molding cycle is executed for each local region, the formation of the sintered layer at the same height can be performed as two or more molding cycles (twice in this embodiment) in the longitudinal direction in FIGS. 12 and 13.

That is, the length in the C direction (depth d in FIG. 3) of the powder layer forming apparatus 11 can be shortened as compared with the conventional case, and miniaturization can be realized. In addition, the miniaturization enables both the powder layer forming apparatus 11 and the cutting machine 50 to be provided in the same horizontal drive device 55. As a result, the size of the chamber 1 becomes approximately a half as compared with the conventional one.

Note that the end surface of the sintered layers in each of the local regions have lower density than that of the other portions. Therefore, when forming a sintered layer with respect to the same height of the molding table 5, it is preferable that the local regions adjacent to each other in the same layer partially overlap, as shown in FIGS. 12 and 13. Hereinafter, a portion where the local regions overlap is referred to as an overlapping portion. With such a configuration, it is possible to increase the density in the overlapping portion, and to realize the formation of a highly accurate sintered layer. In FIGS. 12 and 13, the adjacent local legions are intentionally showed with a shift each other in the lateral direction in light of the visibility, but the present invention is not limited thereto.

The sintered layer may be formed by the laser beam L, for example, after recoating in all the local regions in the same layer. However, since the surplus of the material powder rises at the end of the local region every time recoating is performed, it is difficult to obtain the flat material powder layer 8. Therefore, it is preferable to execute the molding cycle for each one of the molding regions. That is preferably, it is not until the molding cycle of one local region is completed that the molding cycle of the other local region start. According to such a configuration, since formation of the sintered layer can be performed on the flat material powder layer 8, occurrence of inferior molding can be suppressed.

Generally, in the powder lamination molding method, when the material powder layer 8 is irradiated with the laser beam L, the sintered layer thinner than the material powder layer 8 is formed. Therefore, in the overlapping portion, once the sintered layer having the desired thickness is formed, the molding cycle is executed again, so that the thicker sintered layer than the other portions is formed. Therefore, the upper surface of the sintered layer in the overlapping portion may be partially removed by cutting with the rotary cutting tool so as to obtain the sintered layer having a uniform thickness. Alternatively, the position of the overlapping portion may be changed for each layer so that the flat sintered object can be obtained after forming the plurality of sintered layers. Alternatively, the irradiation conditions of the laser beam L in the overlapping portion may be changed so as to obtain the sintered layer having a uniform thickness.

Figure 14A:
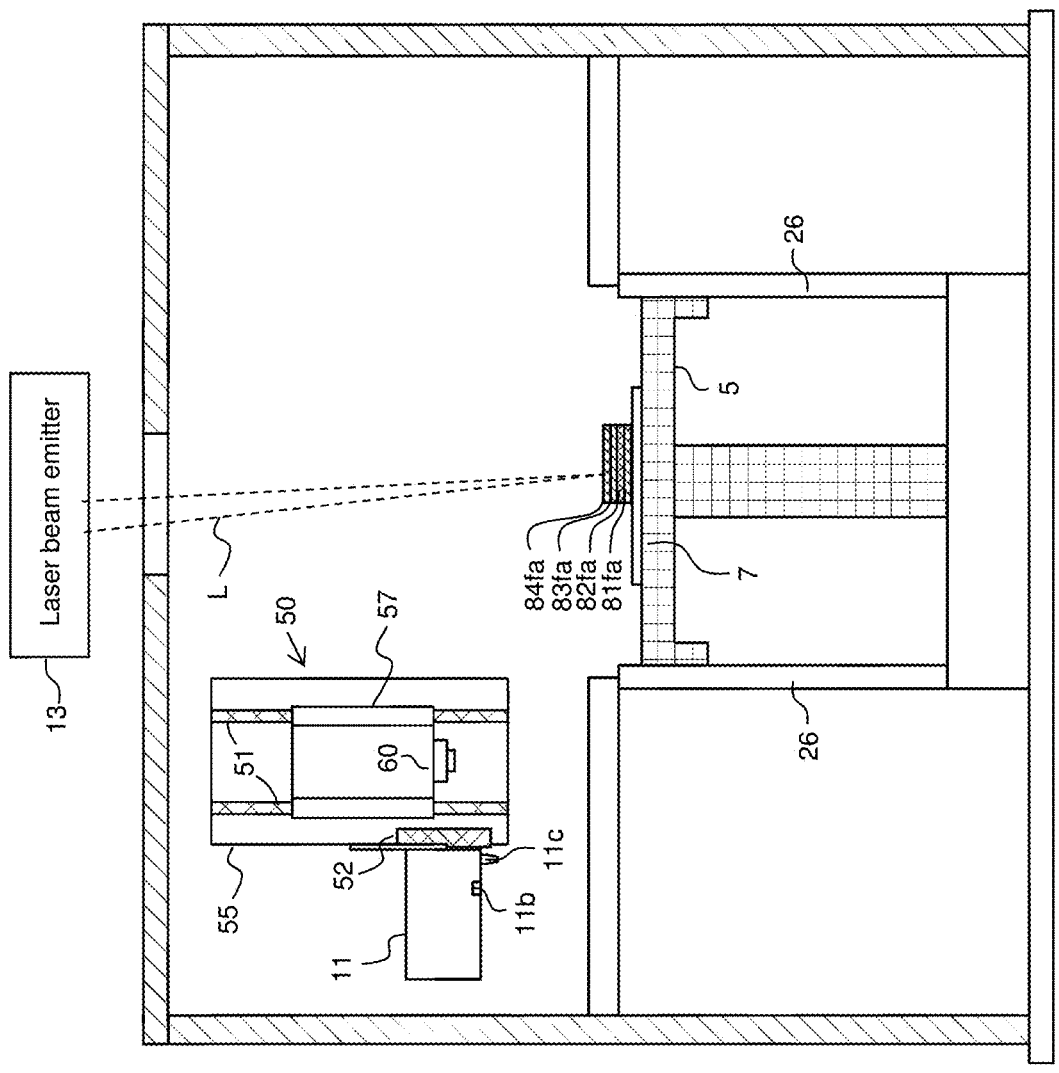
FIGS. 14A and 14B are explanatory diagrams of the lamination molding method using the lamination molding apparatus according to the embodiment of the present invention.
Figure 14B:
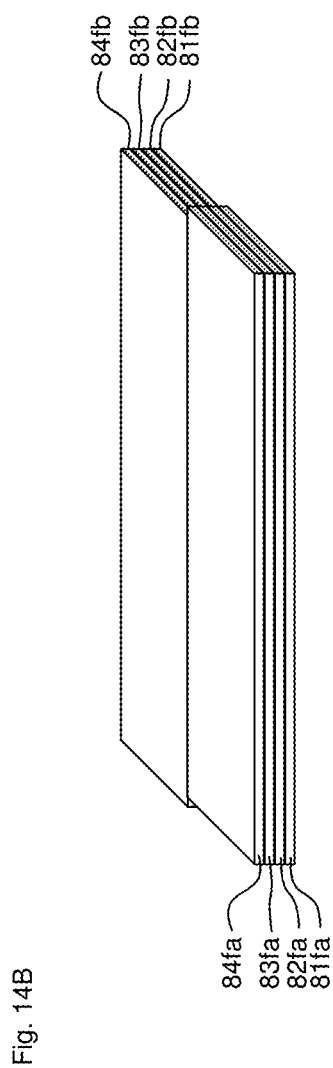

By repeating these procedures, as shown in FIGS. 14A and 14B, the second layers of sintered layer 82*fa* and 82*fb*, the third layers of sintered layer 83*fa* and 83*fb*, and the fourth layers of sintered layer 84*fa* and 84*fb* are formed. Not only the horizontally adjacent sintered layers but also the vertically adjacent sintered layers are firmly fixed with each other.

Further, for the purpose of improving the surface accuracy of the molded object, the cutting may be performed on the surface (mainly the end surface) of the sintered layers with a rotary cutting tool every time a predetermined number of sintered layers are formed. At this time, the powder layer forming apparatus 11 is already moved to a position not interfering with the cutting with the shutter 11*d* thereof closed.

In forming the sintered layer by the laser beam L, the spatters are scattered, and the residue of the material powder contained in the spatters sometimes adheres to the surface of the sintered layer and becomes an abnormal sintered portion which has a protruding shape. When the blade 11*c* collides with the abnormal sintered portion at the time of forming the material powder layer 8, it is preferable that the shutter 11*d* is closed, the formation of the material powder layer 8 is temporarily stopped, and the abnormal sintered part is cut and removed by the rotary cutting tool. In this case as well, the powder layer forming apparatus 11 is retracted vertically upward as a case of the other cutting process. However, since the material discharge unit 11*b* is closed by the shutter 11*d*, the material powder is not wastefully discharged. After removing the abnormal sintered portion in this way, the formation of the material powder layer 8 is resumed.

Non-sintered material powder is removed after forming a desired number of the sintered layers, thereby the molded sintered object can be obtained. The sintered object is applicable to a mold for the resin molding for example.

Each of the local regions is calculated by a control device (not shown) from the position and area of a region with the material powder layer 8 formed thereon (hereinafter referred to as recoating region), the width of the blade 11*c*, the position and area of the overlapping portion, and the like. The recoating region, that is, the union of each local region, is configured to include at least the irradiation region. For example, the recoating region may be variably set for each layer according to the position and area of the irradiation region for each layer. Alternatively, the recoating region may be set so as to substantially match the projection area of the finished molded object. In the case of the latter configuration, calculation of the recoat area is only required once at the start of the molding, so that the configuration is particularly effective in the molding in which the irradiation region does not change significantly for each layer, for example, in molding the molded object having a substantially rectangular parallelepiped shape such as a mold. At every prescribed timing, for example, when the aforementioned cutting is performed each time predetermined number of the sintered layers are formed, the recoating region may be re-set. In the case of this configuration, it is possible to reduce the number of calculations with respect to the calculation of the recoating region and to reduce the usage of the material powder preferably.

EXPLANATION OF SYMBOLS

1: chamber
1a: window
1b: chamber supplying opening
1c: chamber discharging opening
1d: molding room
1e: sub supplying opening
1f: sub discharging opening
4: base
5: molding table
7: molding plate
8: material powder layer
11: powder layer forming apparatus
11a: material holding section
11b: material discharge unit
11c: blade
11d: shutter
11e: shutter through-hole
11f: shutter opening/closing unit
11g: shutter groove guide
11h: seal member
13: laser beam emitter
15: inert gas supplying apparatus
17: fume diffusing device
17a: housing
17b: opening
17c: diffusing member
17d: inert gas supplying space
17e: pores
17f: clean room
19: fume collector
21: duct box
23: duct box
26: powder retaining wall
33d: fume diffusing device supplying opening
34a: first discharging opening supply
42: laser beam source
43a: galvanometer mirror
43b: galvanometer mirror
44: condensing lens
50: cutting machine
51: first vertical drive device
52: second vertical drive device
55: horizontal drive device
57: machining head
60: spindle head
81fa: sintered layer
81fb: new sintered layer
82fa: sintered layer
83fa: sintered layer
84fa: sintered layer
L: laser beam
R: molding region

What is claimed is:

1. A lamination molding apparatus, comprising:
   a chamber covering a molding region;
   a powder layer forming apparatus having a material discharge unit which is a through hole for discharging a material powder onto the molding region and a blade to planarize the material powder on the molding region and form a material powder layer;
   a laser beam emitter to emit a laser beam for sintering the material powder to form a sintered body;
   a cutting machine to cut the sintered body;
   a horizontal driver, the horizontal driver comprising a moving body configured to move simultaneously both the cutting machine and the powder layer forming apparatus on the moving body in a horizontal direction parallel to the molding region;
   a first vertical driver, the first vertical driver comprising a guide rail and a linear driver positioned on the guide rail, the first vertical driver provided in the moving body of the horizontal driver and reciprocating independently the cutting machine in a vertical direction orthogonal to the horizontal direction; and
   a second vertical driver, the second vertical driver comprising a second guide rail and a second linear driver positioned on the second guide rail, the second vertical driver provided in the moving body of the horizontal driver and reciprocating independently the powder layer forming apparatus in the vertical direction.

2. The apparatus of claim 1, wherein when cutting the sintered body, the cutting machine is moved vertically downward and the powder layer forming apparatus is moved vertically upward to a position not interfering with the cutting.

3. The apparatus of claim 1, wherein the powder layer forming apparatus is configured to be capable of switching start and stop of discharge of the material powder.

4. The apparatus of claim 3, wherein the powder layer forming apparatus further includes a shutter for opening and closing the material discharge unit, and a shutter through-hole accommodating the shutter therein slidably.

5. The apparatus of claim 1, wherein the molding region has a plurality of local regions in which the material powder layer is formed and sintered with the laser beam, and adjacent two of the local regions in a same height are partially overlapped each other.

* * * * *